United States Patent [19]

Clark

[11] 3,923,944

[45] Dec. 2, 1975

[54] BRIQUETTING CALCIUM CHLORIDE PARTICULATE

[75] Inventor: Michael J. Clark, Ludington, Mich.

[73] Assignee: The Dow Chemical Company, Midland, Mich.

[22] Filed: Jan. 28, 1974

[21] Appl. No.: 437,267

[52] U.S. Cl. .................. 264/109; 23/313; 423/497; 423/128; 252/192; 252/194
[51] Int. Cl. ...... C01f 11/24; B01j 2/22; B01d 53/26
[58] Field of Search...... 23/293 R, 293 A, 304, 313; 264/109, 128, 117; 423/497; 252/194, 192

[56] References Cited

UNITED STATES PATENTS

| | | | |
|---|---|---|---|
| 1,527,121 | 2/1925 | Cottringer | 23/293 A |
| 1,738,492 | 12/1929 | Collings | 23/304 |
| 1,951,886 | 3/1934 | Sundstrom | 23/300 |
| 1,958,034 | 5/1934 | Collings | 23/304 |
| 2,729,855 | 1/1956 | Titus | 264/109 |
| 2,839,360 | 6/1958 | Gump | 23/304 |
| 3,250,593 | 5/1966 | Wilcox | 23/293 R |
| 3,339,618 | 9/1967 | Bowden | 23/304 |
| 3,414,643 | 12/1968 | Collie | 264/109 |
| 3,433,863 | 3/1967 | Bowden | 23/293 R |
| 3,513,230 | 5/1970 | Rhees | 264/109 |
| 3,649,240 | 3/1972 | Bolduc | 23/313 |
| 3,732,082 | 5/1973 | Kolat | 23/293 A |
| 3,772,037 | 11/1973 | Meyer | 23/313 |
| 3,779,936 | 12/1973 | Pearce | 210/502 |

OTHER PUBLICATIONS

Belgian Report No. 77'A', July 7, 1961.

*Primary Examiner*—Norman Yudkoff
*Assistant Examiner*—S. J. Emery
*Attorney, Agent, or Firm*—Robert W. Selby

[57] ABSTRACT

An improved method of forming a fracture resistant calcium chloride compact by forming a compact from calcium chloride particles and then applying from about ½ to about 10 weight per cent water to an exterior surface of the compact.

17 Claims, No Drawings

BRIQUETTING CALCIUM CHLORIDE PARTICULATE

BACKGROUND OF THE INVENTION

This invention pertains to calcium chloride and more in particular to the production of compacted calcium chloride particulate.

Oftentimes it is desirable to obtain compacted calcium chloride, such as briquettes, from more finely divided calcium chloride particulate. Calcium chloride briquettes have been found to be useful as, for example, a desiccant. In compacting finely divided anhydrous calcium chloride into briquettes it is usually necessary to employ a binder to cause the individual calcium chloride particles to adhere to one another. Exemplary of one such binder used to form briquetted calcium chloride is described in U.S. Pat. No. 3,779,936. Also, in shaping the briquettes it is usually necessary to utilize a release agent to insure that the calcium chloride separates from the surface of the briquetting die and does not build up sufficiently to cause the production of partial or broken briquettes.

One difficulty occasionally encountered with calcium chloride briquettes using an organic binder is foaming during use as a desiccant. It is highly desirable to produce a briquette which will effectively act as a desiccant and does not contain undesirable foam producing compounds.

SUMMARY OF THE INVENTION

It has been surprisingly found that certain quantities of water applied to an exterior portion of a calcium chloride compact satisfactorily enhance the fracture strength of the compact and simultaneously act as a release agent to permit removal of the formed compact from the compacting means. In the herein described improved process of producing a calcium chloride compact from a calcium chloride particulate, water is applied to an exterior portion of the compact in an amount of from about ½ to about 5 weight per cent of the final compact. The starting calcium chloride particulate used in the described process contains less than about 10 weight per cent water.

The so-treated compact has an improved fracture strength over that of compacts employing no binder. Furthermore, organic binders previously employed have caused foaming in certain types of operations. The compact of the present invention using water as a binder and mold release agent has been found to cause a minimum of foaming in use as, for example, a desiccant.

DESCRIPTION OF THE PREFERRED EMBODIMENTS

In a preferred embodiment calcium chloride particulate is compacted in the presence of from about ½ to about 1½ weight per cent water to form a compact having a calcium chloride-binder surface portion and a substantially anhydrous interior. Preferably the particulate contains less than about 6, more preferably is substantially anhydrous and even more preferably the starting material contains less than about 0.02 weight per cent water.

The water is suitably applied to the starting calcium chloride particulate to obtain a coating on the surface of the final calcium chloride compact. This coating of water combines with the calcium chloride to provide a calcium chloride complex layer which enhances the fracture strength of the compact without deleteriously affecting the desirable properties of calcium chloride as, for example, a desiccant material.

Desirably the particulate is first compacted by means known to those skilled in the art. Suitable compacting means include pressing or passing the particulate through briquetting rolls with indentations or cavities therein corresponding to the shape of the desired briquette. The stipulated quantity of water is thereafter applied to the compacted surface. It is critical that the water be applied only to the exterior portion of the compact and not be uniformly distributed throughout the final calcium chloride material. It has been found convenient to first apply water to the cavities or molds within a compacting means, such as briquetting rolls, and then compacting the calcium chloride particulate. By applying a fine or air-atomized spray of water to the surface of the compacting means, the surface of the final compact will have a strong, fracture resistant surface portion and a substantially anhydrous interior portion.

In the present method water, and the normal impurities found therein, is the only effective binder employed. By using only a water binder, the final shaped calcium chloride compact contains only a thin layer of a calcium chloride hydrate and normal impurities contained in the calcium chloride. Such impurities can be sodium chloride, potassium chloride, calcium carbonate, calcium hydroxide, lithium chloride and strontium chloride. The interior portion of the calcium chloride compact preferably remains substantially as anhydrous as was the starting material.

The following examples further illustrate the invention.

Calcium chloride granules with a U.S. Standard mesh size of less than 20 were compressed at a temperature of about 150°C into ½ inch oval shaped briquettes on a commercial roll-type briquetter. The feed particulate contained less than 0.02 weight per cent water. The briquette was pretreated by applying sufficient water to the mold cavities in the roll surface, by using an air-atomized spray, to provide about one weight per cent water to substantially the entire exterior surface of the formed calcium chloride briquette. The briquette was not dried after application of the water. The so-formed calcium chloride compact was found to be a coherent mass resistant to breakage and satisfactory for use as a desiccant.

In a manner substantially as described in the hereinbefore example, calcium chloride compacts are produced at room temperature by applying ½, 3 or 5 weight per cent water to only the surface of substantially anhydrous calcium chloride compacts. The so-formed compacts will be resistant to fracturing during transit or use.

What is claimed is:

1. A method of producing calcium chloride briquettes comprising briquetting calcium chloride particulate having a moisture content of less than about 0.02 weight per cent water including applying about ½ to about 1½ weight per cent of a binder consisting essentially of water to substantially only the exterior surface of the briquettes during the briquetting process, thereby to form briquettes having a hydrated calcium chloride surface portion and a substantially anhydrous interior.

2. The improvement of claim 1 wherein a calcium chloride drying step is absent after the water is applied to the exterior surfaces of the briquettes.

3. The improvement of claim 1 including first briquetting the particulate and then applying the water to the briquetted surface.

4. The improvement of claim 1 wherein the water is applied in an amount of from about ½ to about 1½ weight per cent of the briquetted calcium chloride.

5. The improvement of claim 1 including first applying water to the briquetting means employed and then briquetting the particulate to thereby apply the water to the exterior surface of the briquettes formed in said means.

6. The improvement of claim 1 wherein the briquettes are produced at a temperature of from room temperature up to about 150°C.

7. The method of claim 1 including applying said water binder to the briquetting means employed and then briquetting the particulate therewith to thereby apply water to the briquette surfaces.

8. The improvement of claim 7 including applying water to the briquetting means as a binder and a mold release agent.

9. A method of producing a calcium chloride briquette from substantially anhydrous calcium chloride particulate by briquetting the particulate, the improvement comprising applying from about ½ to about 5 weight per cent water to substantially only the exterior surface of the briquette to thereby form a fracture resistant briquette which apart from a hydrated surface portion contains only substantially anhydrous calcium chloride.

10. The improvement of claim 9 wherein water is applied to the entire exterior surface of the briquette.

11. The improvement of claim 9 wherein the briquette is produced at a temperature of from room temperature up to 150°C.

12. The improvement of claim 9 wherein a calcium chloride drying step is absent after the water is applied to an exterior portion of the briquette.

13. The improvement of claim 9 including applying water to the briquetting means as a surface binder and a mold release agent.

14. The improvement of claim 9 wherein briquetting is carried out on a roll-type briquetter.

15. The improvement of claim 9 wherein the water is applied in an amount of from about ½ to about 1½ weight per cent of the briquette to form a briquette suitable for use as a desiccant.

16. The improvement of claim 9 including first applying water to a briquetting means and then briquetting the particulate to thereby apply water to substantially only the exterior surface of the briquette.

17. The improvement of claim 16 including applying the water to the mold cavities in the briquetting means by use of an air-atomized spray.

* * * * *